United States Patent [19]

French

[11] Patent Number: 4,699,754
[45] Date of Patent: Oct. 13, 1987

[54] JET PUMP-DRIVE SYSTEM FOR HEAT REMOVAL

[75] Inventor: James R. French, LaCanada, Calif.

[73] Assignee: The United States of America as represented by the administrator of the National Aeronautics and Space Administration, Washington, D.C.

[21] Appl. No.: 739,789

[22] Filed: May 31, 1985

[51] Int. Cl.$^4$ .................. G21C 15/18; G21C 15/24
[52] U.S. Cl. ................................. 376/299; 376/281; 376/407; 417/76; 417/87; 417/173
[58] Field of Search ............. 376/298, 299, 372, 392, 376/402–405, 407, 281; 417/50, 87, 76, 173, 176

[56] References Cited

U.S. PATENT DOCUMENTS

| | | | |
|---|---|---|---|
| 3,274,065 | 9/1966 | Kierulf et al. | 376/407 |
| 3,445,335 | 5/1969 | Gluntz | 376/407 |
| 3,912,584 | 10/1975 | Rubinstein | 376/298 |
| 3,987,628 | 10/1976 | Gassman | 417/76 |
| 4,051,892 | 10/1977 | Reinsch | 376/299 |
| 4,138,318 | 2/1979 | Speelman | 376/407 |
| 4,186,051 | 1/1980 | Buscher et al. | 376/299 |
| 4,280,796 | 7/1981 | Reinsch | 417/176 |
| 4,347,623 | 8/1982 | Reinsch | 376/407 |
| 4,367,194 | 1/1983 | Schenewerk et al. | 376/281 |
| 4,407,773 | 10/1983 | Woudstra | 376/299 |
| 4,543,047 | 9/1985 | Hasegawa | 417/76 |
| 4,565,748 | 1/1986 | Dahl | 417/50 |
| 4,587,079 | 5/1986 | Fajeau et al. | 376/299 |

FOREIGN PATENT DOCUMENTS

| | | | |
|---|---|---|---|
| 3116443 | 11/1982 | Fed. Rep. of Germany | 376/282 |
| 3323083 | 1/1985 | Fed. Rep. of Germany | 376/299 |
| 0034198 | 2/1968 | Japan | 376/407 |
| 0035894 | 4/1978 | Japan | 376/298 |
| 2143670 | 2/1985 | United Kingdom | 376/299 |

Primary Examiner—Deborah L. Kyle
Assistant Examiner—Daniel Wasil
Attorney, Agent, or Firm—Paul F. McCaul; John R. Manning; Thomas H. Jones

[57] ABSTRACT

The invention does away with the necessity of moving parts such as a check valve in a nuclear reactor cooling system. Instead, a jet pump, in combination with a TEMP, is employed to assure safe cooling of a nuclear reactor after shutdown. A main flow exists for a reactor coolant. A point of withdrawal is provided for a secondary flow. A TEMP, responsive to the heat from said coolant in the secondary flow path, automatically pumps said withdrawn coolant to a higher pressure and thus higher velocity compared to the main flow. The high velocity coolant is applied as a driver flow for the jet pump which has a main flow chamber located in the main flow circulation pump. Upon nuclear shutdown and loss of power for the main reactor pumping system, the TEMP/jet pump combination continues to boost the coolant flow in the direction it is already circulating. During the decay time for the nuclear reactor, the jet pump keeps running until the coolant temperature drops to a lower and safe temperature where the heat is no longer a problem. At this lower temperature, the TEMP/jet pump combination ceases its circulation boosting operation. When the nuclear reactor is restarted and the coolant again exceeds the lower temperature setting, the TEMP/jet pump automatically resumes operation. The TEMP/jet pump combination is thus automatic, self-regulating and provides an emergency pumping system free of moving parts.

2 Claims, 2 Drawing Figures

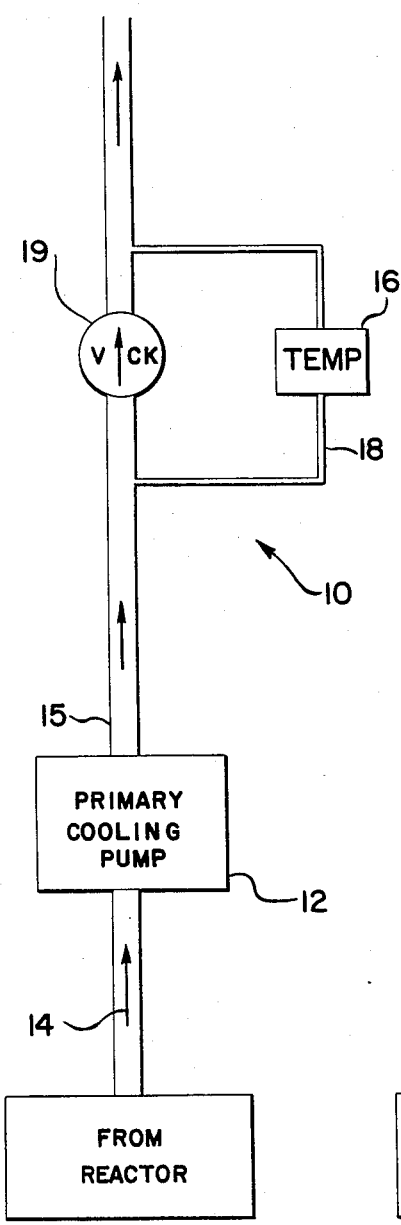
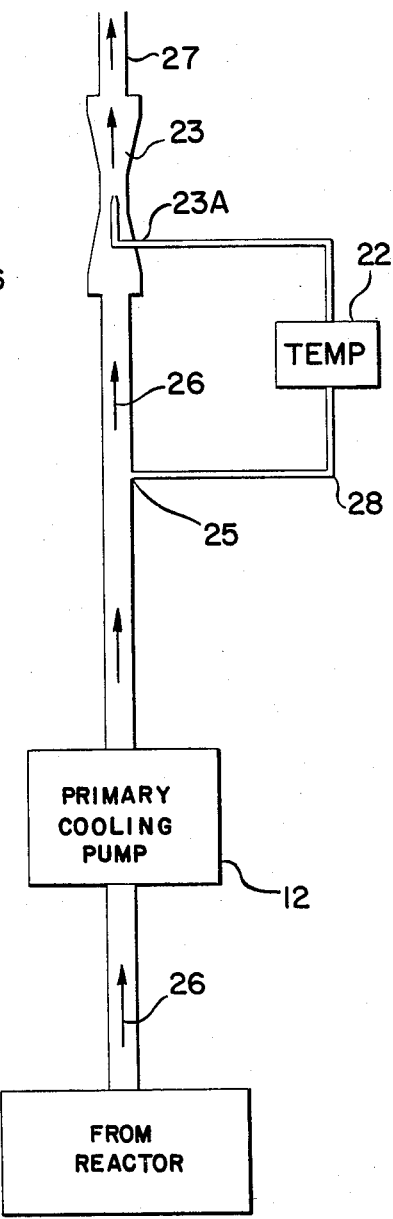
FIG. 1
PRIOR ART
FIG. 2

JET PUMP-DRIVE SYSTEM FOR HEAT REMOVAL

BACKGROUND OF THE INVENTION

1. Origin of the Invention

The invention described herein was made in the performance of work under a NASA Contract and is subject to the provisions of Public Law 96-517 (35 USC 202) in which the contractor has elected not to retain title.

2. Field of the Invention

An emergency of normal shutdown of any high-temperaturized nuclear reactor creates a need for a system to remove excessive heat. During the course of their operation, such nuclear reactors produce radioactive materials which decay and produce heat for a period of time after reactor shutdown. To prevent damage or destruction to the reactor and associated systems, the liquid metal coolant must continue to circulate until a safe temperature is achieved. After the reactor shutdown, there may not be enough power for the main pumping system to continue operation.

In accordance with this invention, a parallel auxiliary Thermoelectric Electromagnetic Pump (TEMP), in combination with a jet pump, is used as a self-starting and self-regulating auxiliary pumping system. Whereas the conventional prior art approach requires moving parts such as check or similar valves, the invention, in a preferred embodiment, does not employ any moving parts. Moving parts, such as check valves, are notoriously unreliable when subjected to high-temperature and held in one position (open or closed) for long periods. This unreliability is especially acute when a highly corrosive hot liquid metal coolant is involved as the cooling medium for the system. Furthermore, if a check valve fails in an open position, the system reactor may be damaged or destroyed.

A parallel TEMP, in this invention, is used to reinject a secondary stream of metal coolant into the main coolant stream. The reinjection, acting as a drive fluid for a jet pump and using the principal of momentum exchange, induces a circulation of the main fluid. Proper arrangement and positioning of the jet pump, with respect to flow withdrawal and reinjection, prevents backflow.

3. Background Discussion

TEMPs have been used in combination with check valves in order to prevent backflow during continued circulation after nuclear reactor shutdown. The TEMP relies upon the excess heat in the nuclear reactor's liquid coolant to keep circulation going until the reactor temperature drops to a safe limit.

When a check valve of the prior art fails in an open condition, which may happen in liquid metal systems, the backflow impedes or prevents circulation and the system may be damaged or destroyed. These moving-part check valves are unreliable in liquid metal circulation systems.

SUMMARY OF THE INVENTION

The invention does away with the necessity of a check valve in a nuclear reactor cooling system. Instead, in this invention a jet pump, in combination with a TEMP, is employed to assure safe cooling of a nuclear reactor after shutdown.

The invention comprises a main flow for reactor coolant together with a point of withdrawal for a secondary flow. A TEMP, responsive to the heat from said coolant in the secondary flow path, automatically pumps said withdrawn coolant to a higher pressure. The higher pressure is applied as a driver flow for a jet pump which has a main flow chamber located in the main flow circulation loop. Upon nuclear shutdown and loss of power for the main reactor pumping system, the TEMP/jet pump combination continues to boost the liquid coolant flow in the direction it is already circulating. During the decay time for the nuclear reactor, the jet pump keeps running until the coolant temperature drops to a lower and safe temperature where the heat is no longer a problem. At this lower temperature, the TEMP/jet pump combination ceases its circulation boosting operation.

When the nuclear reactor is restarted and the coolant again exceeds the lower temperature setting, the TEMP/jet pump automatically resumes operation. Although continually operative while the reactor is operational, the TEMP/jet pump efficiency loss is small. Thus, a highly reliable protection system is provided by this invention.

BRIEF SUMMARY OF THE DRAWINGS

FIG. 1 is a known prior art TEMP/check valve system; and

FIG. 2 depicts the TEMP/jet pump combination for coolant flow in accordance with this invention.

DETAILED DESCRIPTION OF THE DRAWINGS

The known prior art is depicted in FIG. 1. A liquid metal coolant circulation system 10 employs a primary cooling pump 12 which takes the hot liquid metal coolant 14 from the reactor and feeds it into a main flow path 15 and an auxiliary flow path 18. A thermoelectric electromagnetic pump (TEMP) 16 is connected in the parallel path and is responsive to the heat for auxiliary pumping of the coolant. A check valve 19 is located in the main flow path 15. When closed, valve 19 prevents backflow.

When the reactor (not shown) shuts down, it is imperative that coolant flow be maintained until the excess temperature has been removed from the reactor. The reactor will not cool to a safe level when the power for the primary cooling pump 12 is lost.

A particularly difficult problem faced by the prior art of FIG. 1 is presented when the check valve 19 fails. If the valve fails in an open position, the flow will simply go around the loop and coolant in the reactor will stagnate, which will damage or destroy the reactor. If the valve fails in a closed condition, the coolant cannot circulate. Such failure of check valves is a distant possibility due to valve 19 remaining open for long periods during high power operations which may be years in duration.

The present invention is depicted in block form in FIG. 2. In the preferred embodiment, a TEMP/jet pump combination 22/23 comprises a safety system which is self-regulating and free of all moving parts. The operation of this novel invention will now be described.

It should be appreciated that the reactor, during operation, may reach a temperature in the order of 1200° K. to 1500° K. (roughly 1700° F. to 2200° F.). Typical of well-known coolants for such a reactor is sodium or potassium or the like. The coolant metal is a very corrosive material. In the interior of reactors, the metal becomes elevated to the reactor's interior temperature. Outside of the reactor (based upon a given set of operations), the coolant temperature is in the order of 900° K. (1200° F.).

The heat of the coolant is used to advantage in this invention by providing a self-regulating and self-powered safety system. The withdrawal point 25 for the hot metal coolant 26 should be located at a point in the system which is safely upstream from a flow restriction. The location of withdrawal and reinjection points, as is well known to those of ordinary skill in the art, shall guard against self-recirculation by the TEMP/jet pump combination.

Assume that the primary coolant pump 12 stops either intentionally or accidentally. The main flow of the hot conductive metal has momentum and tends to continue its flow. That momentum is used to advantage in this invention.

The withdrawn hot metal 28 is a good electrical conductor. The TEMP 22 generates a magnetic field using electrical energy from thermoelectric elements driven by the heat of the hot metal 28. The magnetic field, in a well-known manner, moves the electrically conductive metal 28. The field is proportional to the heat and thus will diminish as the coolant cools down. Accordingly, the coolant 26, 28 continues to circulate in the same direction that the coolant was circulating when the reactor (not shown) shut down. The withdrawn coolant is raised to a high pressure at the output side of TEMP 22. That high pressure is fed into the drive side 23A of the jet pump 23 where the pressure is converted to velocity. A jet pump 23, as well known in the art, reacts to the high velocity to drag the main flow stream along with it.

The main flow 26, 27 is larger, slower and at a lower pressure than the withdrawn coolant 28 through the TEMP 22. That main flow is through the main opening of jet pump 23. The output side 27 from the jet pump 23 is circulated through the reactor's cooling system in a standard manner.

Since the TEMP responds to the heat in the coolant 26, the withdrawn coolant 28 circulates with greater pressure and velocity when the coolant is hottest. As the coolant continues to circulate, the coolant loses its temperature and the coolant's velocity is slower. At a safe lower temperature, the coolant circulation stops. By the time the circulation stops, the reactor's time decay heat is no longer a problem.

As soon as the coolant warms up again on the next reactor operation, the TEMP 22 and jet pump 23 automatically resume functioning. Although the TEMP/jet pump combination operates while the reactor is on, the flow is small compared to the main flow. Thus, the system's efficiency is not diminished. Obviously, the safety factor is greatly enhanced by this invention, which provides a circulation system without any moving parts and which is self-regulating.

If a small amount of stand-by energy is available, the TEMP could be replaced by an electrically-driven centrifugal pump of any well-known type. Such a pump, however, does have moving parts and thus is not the most preferred embodiment.

Other modifications will readily suggest themselves to those of ordinary skill in the art without departing from the spirit and scope of the claimed invention.

What is claimed is:

1. In a nuclear reactor having an electrically conductive metal coolant, said reactor having an elevated operating temperature at which the metal coolant circulates through the reactor to remove heat therefrom and a safe temperature at which the reactor is shut down and is sufficiently cool for the flow of metal coolant through the reactor to be terminated, the improvement comprising a reactor cooling system that includes:

a primary flow path for the metal coolant;
a primary pump positioned in the primary flow path to provide a primary pumping force to the metal coolant;
an auxiliary flow path for the metal coolant;
said auxiliary flow path being parallel in flow to a portion of the primary flow path;
a jet pump positioned in the primary flow path for the metal coolant;
said auxiliary flow path including an inlet and a discharge connecting the auxiliary path to the primary path;
said jet pump having a drive nozzle with the discharge from the auxiliary flow path positioned to feed metal coolant into said drive nozzle, and
temperature responsive pump means positioned in the auxiliary flow path with the pump means operating at temperatures above the safe temperature of the reactor to increase the velocity of metal coolant in the auxiliary flow path and to drive the jet pump, whereby the temperature responsive pump means provides coolant flow through the reactor during shutdown of the reactor as the reactor and the metal coolant for the reactor undergo cooling from the reactor operating temperature down to the safe temperature where coolant flow through the reactor may be terminated.

2. The nuclear reactor of claim 1 wherein said pump means is a thermoelectric electromagnetic pump which is powered by the heat of the metal coolant in the auxiliary flow path to generate a magnetic field that pumps the electrically conductive metal coolant.

* * * * *